US006907802B2

(12) United States Patent
Schneider

(10) Patent No.: US 6,907,802 B2
(45) Date of Patent: Jun. 21, 2005

(54) TOOL FOR DETECTING THE RELEASE OF ENERGY

(76) Inventor: Robert H. Schneider, 46793 44th Ave., Lawrence, MI (US) 49064

( * ) Notice: Subject to any disclaimer, the term of this patent is extended or adjusted under 35 U.S.C. 154(b) by 28 days.

(21) Appl. No.: 10/712,213

(22) Filed: Nov. 13, 2003

(65) Prior Publication Data

US 2004/0117963 A1 Jun. 24, 2004

Related U.S. Application Data

(60) Provisional application No. 60/427,303, filed on Nov. 18, 2002, and provisional application No. 60/426,169, filed on Nov. 14, 2002.

(51) Int. Cl.[7] .............................................. B25B 27/10
(52) U.S. Cl. ............................. 81/9.3; 81/487; 29/229
(58) Field of Search .......................... 81/9.3, 486, 487, 81/3.7; 29/225, 229, 243.56, 426.6; 269/243

(56) References Cited

U.S. PATENT DOCUMENTS

| | | | | |
|---|---|---|---|---|
| 3,459,030 A | * | 8/1969 | Wilson | 72/452.6 |
| 6,170,360 B1 | * | 1/2001 | Smith | 81/9.3 |
| 6,370,985 B1 | * | 4/2002 | Wu | 81/9.3 |

* cited by examiner

Primary Examiner—Jacob K. Ackun, Jr.
(74) Attorney, Agent, or Firm—Van Dyke, Gardner, Linn & Burkhart, LLP

(57) ABSTRACT

A tool for actuating a workpiece includes a fixed member for contacting a contact surface of a workpiece and a movable member, which is supported by the fixed member for generally linear movement relative to the fixed member. The movable member is for contacting a second contact surface of the workpiece. The tool further includes a trigger mechanism for urging the movable member into engagement with the second contact surface. The trigger mechanism has stored energy therein and is adapted to apply a load to the movable member whereby the movable member moves over a first range of movement for moving the second contact surface relative the first contact surface in response to the load for actuating the workpiece. In addition, the trigger mechanism releases at least a portion of the stored energy when the movable member no longer detects a reaction force from the second contact surface to thereby move the movable member over a second range of movement in response to the release of the stored energy. The tool also includes a sensor for detecting at least the second range of movement of the movable member and generating a signal in response to the second range movement of the movable member whereby the sensor generates a signal at least when the workpiece is actuated.

34 Claims, 3 Drawing Sheets

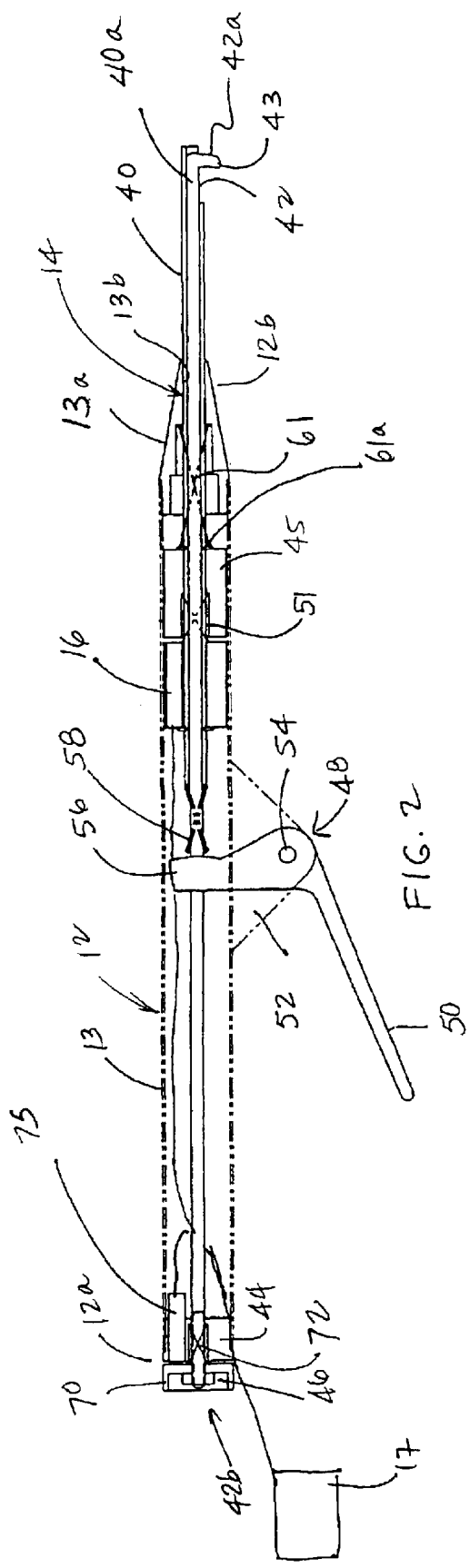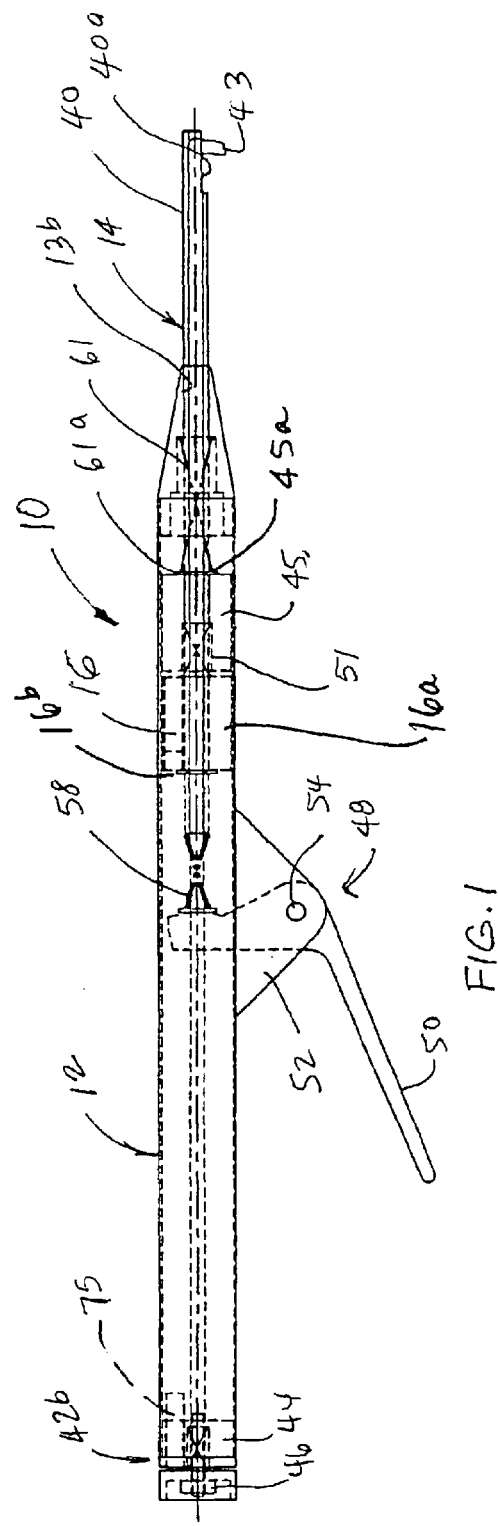

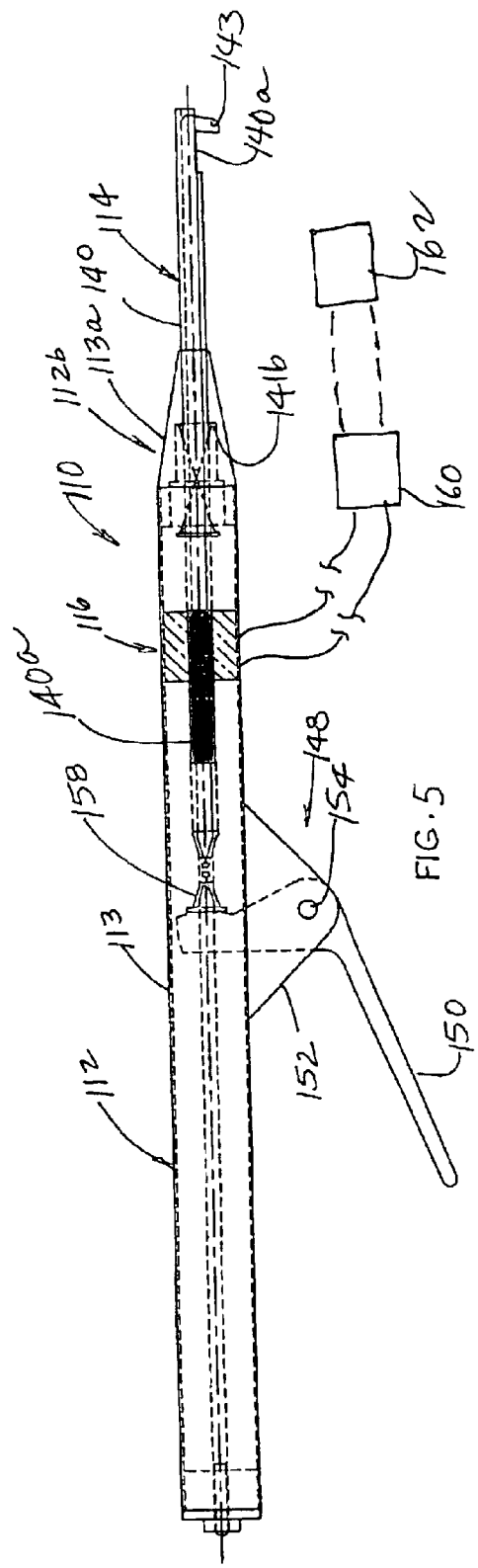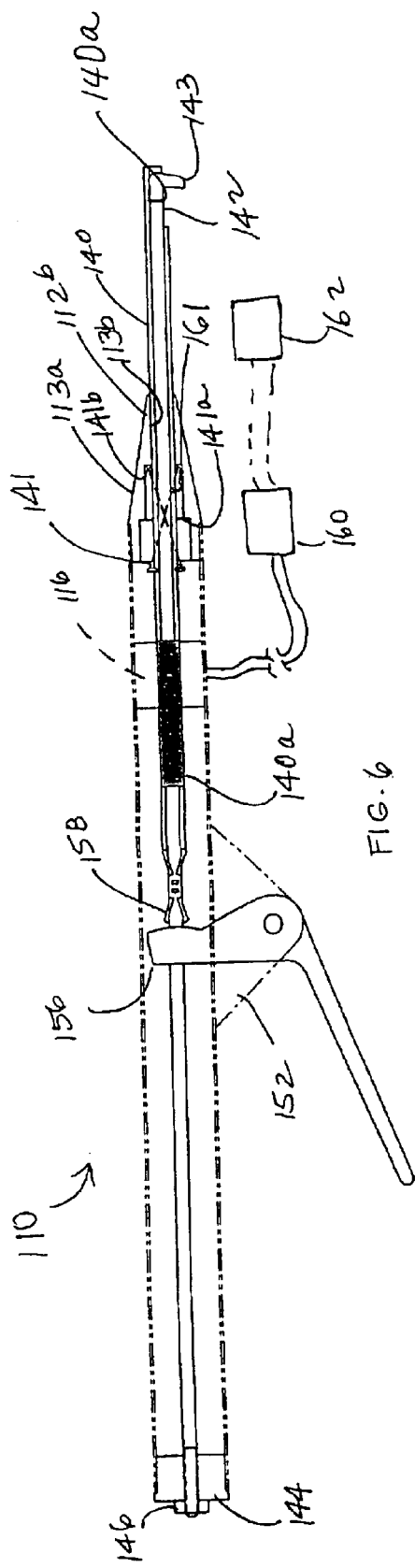

TOOL FOR DETECTING THE RELEASE OF ENERGY

This application claims priority from U.S. provisional application Ser. No. 60/426,169, filed Nov. 14, 2002, entitled TOOL FOR DETECTING THE RELEASE OF ENERGY, and U.S. provisional application Ser. No. 60/427,303, filed Nov. 18, 2002, entitled TOOL FOR ACTUATING A CLIP-LESS CLAMP, and are herein incorporated by reference in their entireties.

TECHNICAL FIELD AND BACKGROUND OF THE INVENTION

The present invention relates to a tool that is particularly suitable for detecting a release of energy and, more particularly, suitable for use as a process verification tool.

When performing manual process steps, such as setting a rivet or a clamp, in an assembly line, such as in a vehicle assembly line, many manufacturers desire confirmation that the process steps have occurred. The repetitive nature of these types of processes steps can lead an assembly line worker to occasionally miss a step. Therefore, by confirming that each process step has been accomplished, the manufacturer can minimize, if not eliminate, the numbers of missed steps in the assembly process and, therefore, improve the quality of their products.

For example, hose clamps in a vehicle assembly line are often manually set or actuated. Some clamps are activated by the removal of a clip. When the line worker removes the clip, the clamp is actuated and the worker places the clip into a collection bin. This placement of the clip in the collection bin has been used to serve as confirmation that the clamp has been set. Other methods include the assembly line worker pressing a button to indicate that a process step has occurred. These and other various methods have been used to provide confirmation that a particular process step or event has occurred. However, confirmation methods used heretofore are not direct confirmations. Instead, they confirm the existence of a secondary occurrence—not the actual occurrence. Therefore, there may be a variation or deviation between the actual occurrences and the secondary occurrences. For example, detection of the placement of the clip in the bin may be triggered by the placement of another item in the bin; therefore, it can be appreciated that the present confirmation systems do not provide full proof confirmation methods.

Consequently, there is a need for a detection system or device that provides a direct measure or indication of when a particular event has occurred.

SUMMARY OF THE INVENTION

Accordingly, the present invention provides a tool that is adapted to detect the release of energy in a workpiece, such as a rivet, fastener, or a clamp, which releases energy when actuated to thereby provide a direct indication that the workpiece has been actuated.

In one form of the invention, a tool for actuating a workpiece, such as a clip-less clamp, includes a housing, a rod, a sleeve, and a sensor. The rod is fixedly mounted in the housing and projects outwardly through an open end of the housing. The sleeve is movable mounted on the rod and supported for generally linear movement relative to the rod and housing, with the sleeve also projecting from the open-end housing. The tool also includes a trigger mechanism, which includes a load spring. The trigger mechanism applies a load to the sleeve with the spring to urge the sleeve outwardly from the housing and to urge the sleeve and the rod into engagement with respective first and second portions of the workpiece. The trigger mechanism is adapted to apply the load to the sleeve to urge the sleeve into engagement with the first portion wherein the sleeve moves over a first range of motion for moving the first portion relative to the second portion in response to the load. When the sleeve no longer detects a reaction force from the first portion of the workpiece, which occurs when the workpiece is actuated, the sleeve moves over a second range of motion relative to the rod. When the sleeve moves over the second range of motion and reaches a pre-selected threshold, the sensor detects the second range of motion and generates a signal that indicates that the clip-less clamp has been actuated.

In one aspect, the sensor comprises a proximity sensor. For example, the tool may include a spring between the sensor and the sleeve so that the sensor does not detect the movement of the sleeve until the spring is compressed, which provides the threshold over which the second range of motion must reach in order to trigger the sensor.

In another form of the invention, a tool for actuating a workpiece includes a fixed member for contacting a first contact surface of a workpiece, a movable member supported by the fixed member for generally linear movement relative to the fixed member, with the movable member for contacting a second contact surface of the workpiece, and a trigger mechanism. The trigger mechanism includes stored energy and is adapted to apply a load to the movable member to urge the movable member to engage the second surface of the workpiece wherein the movable member moves over a first range of movement for moving the second contact surface relative to the first contact surface in response to the load for actuating the workpiece. Furthermore, the trigger mechanism releases at least a portion of the stored energy when the movable member no longer detects a reaction force from the second contact surface so that the movable member moves over a second range of movement in response to the release of the stored energy. The tool further includes a sensor that is used to detect at least the second range of movement of the movable member and generates a signal in response to the second range of movement of the movable member whereby the sensor generates a signal at least when the workpiece is actuated.

In one aspect, the sensor detects the first range of movement and the second range of movement of the movable member. For example, the sensor may comprise a coil, with the movable member including a magnet, wherein the coil detects movement of the magnet to thereby detect the range of movements of the movable member. Alternately, the sensor may comprise a light sensor, with the movable member including a plurality of markings wherein the light sensor detects the movement of or pulses generated by the markings to thereby detect the range of movements of the movable member.

In other aspects, the fixed member comprises a housing. The movable member is supported in the housing and extends through at least a portion of the housing when moving over the first and second range of movements. For example, the fixed member may include a rod, which extends through the housing and on which the movable member is supported. For example, the movable member may comprise a sleeve, with the rod extending through the sleeve. In a further aspect, the rod projects from the housing and forms a fixed contact surface for contacting the first contact surface of the workpiece.

In other aspects, the trigger mechanism comprises an energy storage member that applies the load to the movable member to thereby move the movable member. For example, the storage energy member may comprise a spring, such as a coil spring. In yet further aspects, the trigger mechanism includes a lever, which is pivotally mounted to the fixed member and urges the energy storage member to apply the load to the movable member.

According to another form of the invention, a tool for actuating a workpiece includes a housing, a first member supported in the housing, a second member supported by the first member for generally linear movement relative to the housing and the first member, and a trigger mechanism. The first member is adapted for contacting a first contact surface of the workpiece. The second member is adapted for contacting a second contact surface of the workpiece. The trigger mechanism urges the second member into engagement with the second contact surface of the workpiece and includes an energy storage member, which applies a load to the second member whereby the second member moves over a first range of movement for moving the second contact surface relative to the first contact surface in response to the load for actuating the work piece. The energy storage member releases at least a portion of its stored energy when the second member no longer detects a reaction force from the second contact surface to thereby move the second member over a second range of movement in response to the stored energy. The tool further includes a sensor for detecting at least the second range of movement of the second member and generates a signal in response to the second range of movement whereby the sensor generates a signal at least when the workpiece is actuated.

In one aspect, the energy storage member comprises a spring, such as a coil spring. In addition, the trigger mechanism may include a lever, which is pivotally mounted to the housing and urges the spring to apply the load to the second member. In preferred form, the sensor detects the first and second range of movements of the second member.

In a further aspect, the sensor may comprise a coil, with the second member including a magnet whereby the coil detects movement of the magnet to thereby detect the range of movements of the second member. Alternately, the sensor may comprise light sensor with the second member including a plurality of markings wherein the light sensor detects pulses generated by the markings to thereby detect the range of movement of the second member.

Accordingly, the present invention provides a tool that can operate on a workpiece and, further, can detect when the workpiece is actuated, for example, by detecting the release of energy in the workpiece, which is particularly suitable for use as a process verification tool when actuating workpieces, such as rivets, fasteners, clamps, or the like, that release energy when actuated.

These and other objects, advantages, purposes, and features of the invention will become more apparent from the study of the following description taken in conjunction with the drawings.

DETAILED DESCRIPTION OF THE DRAWINGS

FIG. 1 is a side elevation view of a tool of the present invention;

FIG. 2 is a fragmentary view of the tool in FIG. 1;

FIG. 5 is a side elevation view of another embodiment of the tool of the present invention; and FIG. 6 is a fragmentary view of the tool of FIG. 5.

DETAILED DESCRIPTION OF THE PREFERRED EMBODIMENTS

Figure 3:
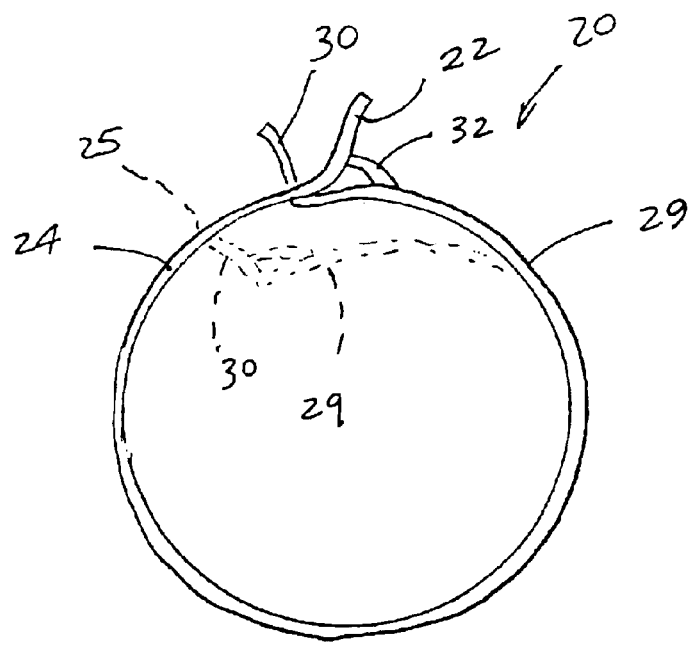
FIG. 3 is a side view of a clip-less clamp.

Referring to FIG. 1, the numeral 10 generally designates a tool of the present invention. As will be more fully described below, tool 10 is adapted to detect the release of energy, for example, in a workpiece, such as a rivet, fastener, or a clamp, including a clip-less hose clamp, that releases energy when actuated to thereby provide a direct indication that the workpiece has been actuated. In addition, tool 10 may be coupled to an assembly line control system, such as a control system for a vehicle assembly line, that integrates the tool into the control system so that the assembly line can be stopped when a workpiece has not been actuated as required to minimize the occurrences of defective products. For ease of illustration, tool 10 will be described in the reference to its use on a clip-less clamp, which is described below. However, it should be understood that the use of tool 10 is not limited for use on a clip-less clamp and may be used on a wide variety of workpieces where a compression or tension or torque force applied to the workpiece will activate the workpiece and at the same time trigger or generate a release of energy in the workpiece. Tool 10, therefore, can provide a direct confirmation, for example, of when a clip-less hose clamp has been properly installed or actuated.

As best seen in FIGS. 1 and 2, tool 10 includes a housing 12 and an extensible or movable member 14, which is supported in housing 12. Tool 10 also includes a sensor 16 that detects when extensible member 14 accelerates. In the illustrated embodiment, sensor 16 detects when extensible member 14 has accelerated to or above a threshold level, which threshold level is determined by a spring 51 positioned in housing 12, as will be more fully described below. Sensor 16 may be coupled to a device, such as an internal or external microprocessor and/or to a controller, such as a programmable logic controller of an assembly line, such as a vehicle assembly line. It should be understood that tool 10 may incorporate an onboard chip or microprocessor. Such coupling or communication may be accomplished either directly through a cable or wiring or a transmitter via radio frequency (RF) signals. As noted above, this invention is particularly useful in a vehicle assembly line environment where the assembly line is driven by a controller, such as a programmable logic controller (PLC).

Figure 4:
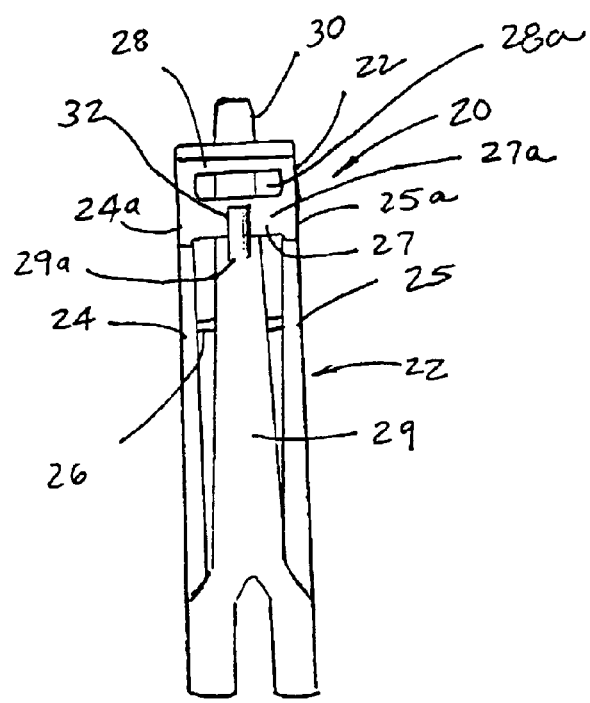
FIG. 4 is a top plan view of the clip-less clamp of FIG. 3.

Referring to FIG. 3, hose clamp 20 is formed from a pre-stressed ring member 22, which is formed from spring steel. In FIG. 3, clamp 20 is illustrated in its unactuated state. When actuated, clamp 20 assumes a more compact configuration than illustrated in FIGS. 3 and 4, as will be more fully described below. One end of member 22 is formed from a pair of spaced apart arms 24 and 25, which are upturned at the respective distal ends 24a and 25a and, further, interconnected by cross bars 26, 27, and 28. Cross bar 27 forms an abutment for the second end of member 22 as will be more fully described below. Cross bar 28 forms an engagement surface for tool 10 which will also be more fully described below. The second end of member 22 is formed from a tapered arm 29 that extends between the respective arms 24 and 25 and includes an upward turned portion 30 at its distal end and an activation tab 32, which is formed from an upward turned medial portion 29a of arm 29. As best seen in FIG. 3, upward turned portion 30 is retained in its unactivated state between arms 24 and 25 and adjacent cross bar 27 by tab 32, which bears against an opposed side 27a of cross bar 27. When tab 32 is disengaged from cross bar 27, clamp 20 is activated such that arm 29 will move inwardly (shown in phantom in FIG. 3) to thereby clamp on the article, such as a hose, positioned in clamp 20. As would be understood by those skilled in the art, when tab 32 is disengaged from cross bar 27, a portion of the energy that is stored in member 22 is released which causes arm 29 to move toward cross bar 26 to its activated position wherein clamp 20 closes and is clamped down on, for example, a hose.

Referring to FIGS. 1 and 2, extensible or movable member 14 comprises a sleeve 40, which is movably mounted on an axial rod 42 that extends through housing 12. In the illustrated embodiment, housing 12 comprises a cylindrical body 13 with a conical member 13*a*, which forms distal end 12*b* of housing 12 and forms a passageway 13*b* through which sleeve 40 moves and in which sleeve 40 is supported for axial movement through housing 12. Axial rod 42 is anchored at its proximal end in housing 12, for example at proximal end 12*a* of housing 12 by an end cap 44 and nut 46. Distal end 42*a* of rod 42 projects through distal end 12*b* of housing 12 and provides a fixed contact or engagement surface for engagement with clamp 20. In the illustrated embodiment, distal end 42*a* of rod 42 comprises a hooked portion 43, which is used to engage clamp 20 described more fully below. Sleeve 40 comprises a cylindrical sleeve and is mounted on the forward end of rod 42 and similarly projects through distal end 12*b* of housing 12 for engagement with clamp 20. Sleeve 40 is movable with respect to rod 42 by a trigger mechanism 48. It should be understood that sleeve 40 may comprise a round cylindrical sleeve or a multi-sided cylindrical sleeve. Similarly rod 42 may have a circular cross-section or a multi-sided cross-section and also may be hollow.

In the illustrated embodiment, trigger mechanism 48 comprises a lever handle 50, which is pivotally mounted to a flange provided or formed on housing 12 by a pin 54. Handle 50 includes a U-shaped or yoke portion 56 that extends into housing 12, and which straddles rod 42. Positioned between yoke portion 56 and sleeve 40 is a load spring 58 which applies an axial spring load force to sleeve 40 when handle 50 is pivoted about pin 54 from its home or unactuated position, such as illustrated in FIG. 1, to one of a plurality of actuating positions in which lever 50 is pivoted about pin 54 closer to housing 12. It should be understood that other lever arrangements and, also, other trigger mechanisms may be used. In this manner, when lever 50 is actuated, load spring 58 will compress and will move sleeve 40 relative to axle rod 42. In addition, when compressed load spring 58 will store energy, which will be used to accelerate sleeve 40, as will be more fully described below. In addition, sleeve 40 includes a weighted member 45 that is mounted on sleeve 40 by a retainer 45*a*, such as a snap ring or E-clip or the like. Member 45 provides additional mass inertia to sleeve 40 to facilitate the acceleration of sleeve 40 forward (to the right as viewed in FIG. 2) when sleeve 40 no longer encounters a reaction force, as will be more fully described below in reference to clamp 20.

In the illustrated embodiment, sensor 16 comprises a proximity switch and further is mounted to sleeve 40 in a mounting block 16*a*, which is mounted to sleeve 40 by a retainer 16*b*, such as a snap ring or clip or the like. In this manner, the contact between member 45 and sensor 16 is largely unaffected by the orientation the tool—in other words the effect of gravity is minimized, if not eliminated.

When sleeve 40 accelerates, block 16*a* and sensor 16 will move toward member 45, with sensor 16 generating a signal in response to contact with member 45. As noted above, sensor 16 is preferably triggered only when sleeve 40 reaches a minimum threshold acceleration. The threshold is set, for example, by a spring 51 that is placed between weighted member 45 and sensor 16, so that contact with sensor 16 by member 45 is not made until spring 51 is compressed. In the illustrated embodiment, spring 51 is partially recessed within weighted member 45; however, it can be appreciated that spring 51 may alternately or additionally be partially recessed in mounting block 16*a*. As would be understood by those skilled in the art, therefore, the threshold level can be adjusted as needed by varying the size or spring constant of the spring. Spring 51 may comprise a coil spring or a spring disc, such as a urethane disc, or the like.

To activate clamp 20, for example, hook portion 43 is inserted into slot 28*a* of ring member 22 formed between cross bar 28 and cross bar 27 and engages cross bar 27 or cross bar 28, depending on the orientation of hook portion 43. Trigger mechanism 48 is then activated to extend sleeve 40 and to urge sleeve 40 into engagement with tapered arm 29 on either side of tab 32. As best seen in FIG. 1, sleeve 40 has a slot 40*a*, which allows sleeve 40 to straddle tab 32 and rest on arm 29. When a sufficient force is applied by trigger mechanism 48 to sleeve 40 to disengage tab 32 from engagement with cross bar 27, tapered arm 29 will spring back away from cross bar 27 with a quick movement away from sleeve 40. This quick movement will result in clamp 20 no longer providing or generating a reaction force back to sleeve 40 and, further, results in sleeve 40 being suddenly urged forward, outwardly from housing 12 under the force of load spring 58 which causes sleeve 40 to accelerate. This sudden acceleration signals that clamp 20 has been actuated. Optionally and preferably, sleeve 40 includes a stop 41 that abuts a shoulder 41*a* formed in housing 12, such as in conical member 13*a* and, for example, in passageway 13*b*, to prevent sleeve 40 from ejecting from housing 12.

Optionally and preferably, tool 10 includes a return spring 61, which has a relatively low spring load relative to load spring 58, which returns sleeve 40 to its home position within housing 12. As best seen in FIG. 2, spring 61 is recessed at least partially in passageway 13*b* and, further, makes contact with a stop 61*a* formed or provided, such as by a snap-ring or the like, on sleeve 40 in order to urge sleeve 40 to return to its home or unactivated position within housing 12 after the trigger mechanism has been released to thereby release the trigger load.

In addition, in order to reduce the risk that tool 10 generates a signal that indicates a clamp or work piece has been actuated when the tool has not been used to trigger a clamp or other work piece, proximal end 42*b* of rod 42 may be mounted for limited axial movement with housing 12. For example, proximal end 42*b* may project through the end of housing 12 and be mounted to a knob or cap 70 by nut 46. Mounted on rod 42 is a spring 71 that must be compressed before knob 70 contacts end of housing 12. As a result, when trigger mechanism 48 is initially pivoted about pin 54, spring 72 will compress before, sleeve 40 moves relative to rod 42. In so doing, if tool 10 is shaken, the inertia in weighted mass 45 will be dampened by spring 72 to reduce the risk that sensor 16 could be inadvertently triggered. In addition as an additional precaution, tool 10 may include a second sensor 75, such as a proximity switch, that is mounted on proximal end of rod 42, which is triggered when spring 72 is compressed. In this manner, tool 10 may be configured such that a valid actuation signal occurs only when both sensors (16 and 75) are triggered. As would be understood by those skilled in the art, both sensors may be coupled to or in communication with the external device (17).

Referring to FIGS. 5 and 6, the numeral 110 generally designates another embodiment of the tool of the present invention. Tool 110 includes a fixed member, such as a housing 112, and an extensible or movable member 114, which is supported in housing 111 and, further, whose movement or acceleration is detected by a sensor 116. As will be more fully described, sensor 116 generates a signal, such as an electrical pulse or the like, in response to movement of extensible member 114, which signal may be used to provide a direct measure of when a specific step has been performed. As will be more fully appreciated from the description that follows, when extensible member 114 is urged into engagement with a workpiece, such as a clip-less clamp, which when actuated no longer generates a reaction force back to extensible member 114, extensible member 114 will accelerate. Similar to the previous embodiment, this movement or acceleration is used to indicate, for example, when clip-less clamp 20 has been actuated. For ease of illustration of how tool 110 can be used, hereinafter reference will be made to the use of tool 110 on clip-less hose clamp 20, described above.

Referring again to FIGS. 5 and 6, extensible or movable member 114 comprises a sleeve 140, which is movably mounted on an axial rod 142 that extends through housing 112. It should be appreciated that the housing itself may provide the fixed contact surface for engaging the work piece. In the illustrated embodiment, housing 112 comprises a cylindrical body 113 with a conical member 113a, which forms distal end 112b of housing 112 and forms a passageway 113b through which sleeve 140 moves and in which sleeve 140 is supported for axial movement through housing 112. Axial rod 142 is anchored at its proximal end in housing 112, for example at proximal end 112a of housing 112 by an end cap 144 and nut 146. Distal end 142a of rod 142 projects through distal end 112b of housing 112 and provides a fixed contact or engagement surface for engagement with clamp 20 similar to the previous embodiment.

Sleeve 140 comprises a cylindrical sleeve and is mounted on the forward end of rod 142 and similarly projects through distal end 112b of housing 112 for engagement with clamp 20. Sleeve 140 is movable with respect to rod 142 by a trigger mechanism 148. "Cylindrical" as used herein is not intended to be limited to a round cylindrical shape and, instead, is used in its broadest sense to mean a closed-section bounded by two or more parallel sides. As would be understood, therefore, as used herein the term "cylindrical" is not limited to a member with a circular cross-section. Similarly rod 142 may have a circular cross-section or a multi-sided cross-section and also may be hollow or have hollow portions.

In the illustrated embodiment, trigger mechanism 148 comprises a lever handle 150 that is pivotally mounted to a flange 152 formed or provided on housing 112 by a pin 154. Lever 150 includes a yoked portion 156 that extends into housing 112 and straddles rod 142. Positioned between yoke portion 156 and sleeve 140 is a load spring 158, which applies a spring load force to sleeve 140 when handle 150 is pivoted about pin 154, for example, when sleeve 140 is moved to its actuated position. In this manner, when sleeve 140 is urged into engagement with clamp 20 (or another workpiece) by actuation of lever 150 and sleeve 140 encounters resistance, spring 158 will compress to store energy in spring 158, all in a similar manner to the first embodiment.

To activate clamp 20, for example, hook portion 143 of rod 142 is inserted into slot 28a of ring member 22 formed between cross bars 28 and cross bar 27 and engages cross bar 27 or cross bar 28, depending on the orientation of hook portion 143. Sleeve 140 is then extended by trigger mechanism 148 and urged into engagement with tapered arm 29 on either side of tab 32. As best seen in FIG. 1, sleeve 140 has a slot 140a, which allows sleeve 140 to straddle tab 32 and rest on arm 29. When a sufficient force is applied to sleeve 140 by trigger mechanism 148 to disengage tab 32 from engagement with cross bar 27, tapered arm 29 will spring back away from cross bar 27 with a quick movement away from sleeve 140. This quick movement will result in clamp 20 no longer providing or generating a reaction force back to sleeve 140 and, further, results in sleeve 140 being suddenly urged forward, outwardly from housing 112 under the force of load spring 158, which causes sleeve 140 to accelerate. This sudden acceleration is an indication that clamp 20 has been actuated. Optionally and preferably, sleeve 140 includes a stop 141 that abuts a shoulder 141a formed in housing 112, such as in conical member 113a and, for example, in passageway 113b, to prevent sleeve 140 from being ejected from housing 112.

As noted above, tool 110 includes a sensor 116 to detect the movement of sleeve 140. Sensor 116 detects the movement of extensible member 114 when the clamp is actuated. Sensor 116 may be coupled to a gauge, a scope, a meter, or a microprocessor 160. To differentiate between the movement of extensible member 114 when it is operating on the clamp before the clamp is actuated and the movement of the clamp after actuation, sensor 116 is preferable coupled to a microprocessor that can compare the signal from the sensor to a selected threshold level and then in turn generate an event signal when the signal from sensor 116 exceeds the threshold level. Again, this is particularly useful in an assembly line environment where the assembly line is driven by a controller 162, such as a programmable logic controller (PLC), with which the microprocessor may communicate, for example through a direct connection (cable or wire) or with a transmitter through radio frequency (RF) signals.

Sensor 116 preferably comprises a linear movement detector, such as a linear encoder, that detects or generates a signal indicative of the movement of sleeve 140. For example, a suitable linear encoder may comprise a coil, which is mounted in a fixed position in or on housing 112. Sleeve 140 may include a magnet, resistor, capacitor or an inductor, the movement of which is detected by the coil, for example. Another suitable linear encoder may include a light sensor, which is similarly mounted in a fixed position in housing 112. In this application, sleeve 140 may include a plurality of markings, such as in a bar code, which when moved is detected as pulses by the light sensor. As noted above, sensor 116 generates a signal to a signal measuring or detecting device, such as a scope or a voltmeter, for example. Where the signal measuring or detecting device displays the magnitude or another parameter of the signal generated by sensor 116, then an operator can determine whether the signal represents an event signal.

Alternately, as noted above, sensor 116 may be coupled to a microprocessor, which generates a signal, for example to a controller 162, such as a programmable logic controller (PLC), with the microprocessor or the PLC comparing the magnitude or frequency or the like of the signal to a threshold magnitude, frequency, or the like to determine whether the signal represents an actuation signal.

Optionally and preferably, tool 110 includes a return spring 161, which has a relatively low spring load relative to load spring 158, that is positioned, for example, in conical member 113a and returns sleeve 140 to its home position within housing 112 after trigger mechanism 148 is released. In the illustrated embodiment, spring 161 is mounted in a recess 141b formed in conical member 113a and mounted on sleeve 140 by a retaining clip or ring, such as a snap ring, which may be used as a stop, such as stop 141.

It should be understood that sensor 116 may be used to measure voltage, resistance, capacitance, inductance, pressure, including pneumatic or hydraulic pressure, or pulses to detect the movement of sleeve 140. In addition, it should be understood many of the parts may be reversed. For example, sleeve 140 may comprise a fixed sleeve, with rod 142 comprising a movable rod within sleeve 140. For example, the sleeve may include an elongate slot for receiving the driving portion of the lever, such as a projecting tab or flange which extends through the slot of the sleeve. The load spring may be contained within the sleeve and coupled to the rod by, for example, a retaining clip or ring, such as a snap ring. The detection of the movement of the rod could then be achieved by a magnet or markings formed or mounted on the rod, with the coil or sensor position exteriorly of sleeve 140 but with the coil or the sensor able to detect the movement of the magnet or markings through the slotted opening formed in the sleeve. Similarly, a return spring may be mounted in the sleeve and coupled to the rod by a retaining ring such as a snap ring or the like. Alternately, the rod or fixed sleeve may be eliminated all together depending on the nature of the work piece, with the housing providing the fixed contact surface.

Furthermore, while the trigger mechanism described and illustrated herein comprises a lever and load spring, other mechanisms may be used to move the respective movable member, whether the movable member comprises the sleeve or the rod, such as a pneumatic trigger provided by pressurized air line, a hydraulic trigger, or other known trigger mechanisms. Moreover, the tool of the present invention may detect both extension or retraction of the respective movable part to provide the detection of the actuation of a work piece that is activated by tension rather than compression, such as in clamp 20. For example, tools 10 or 110 may be used to actuate a cable tie or the like in which tension is required. Where tension is required to actuate the workpiece, tools 10 or 110 may be configured to detect the retraction of the respective movable part into the tool housing using similar principals as noted above. Furthermore, the housing may be used to provide the fixed contact surface in lieu of the rod. It should also be understood that sensor 116 may be configured or adapted to measure the movement or acceleration of the movable member only when the movable member moves (or accelerates) above the pre-selected threshold similar to the first embodiment. Moreover, tool 10 or 110 may incorporate an on-board chip or microprocessor for processing the signal, for example, so that tool 10 only generates a binary signal—a signal that indicates actuation and no signal when there is no actuation or the reverse.

While several forms of the invention have been shown and described, other forms will now be apparent to those skilled in the art. For example, while all of the springs are illustrated as coil springs, other springs may be used, such as urethane discs with center holes or the like. In addition, sensor 16 and block 16a may be switched with member 45 so that sensor 16 is forward (in the direction of extension of sleeve 40) of member 45. Therefore, it will be understood that the embodiments shown in the drawings and described above are merely for illustrative purposes, and are not intended to limit the scope of the invention that is defined by the claims, which follow as interpreted under the principles of patent law including the doctrine of equivalents.

I claim:

1. A tool for actuating a workpiece, the workpiece having a first contact surface and a second contact surface, the workpiece being actuated when the second contact surface is moved relative to the first contact surface and releasing energy when being actuated, said tool comprising:

a fixed member for contacting the first contact surface of the workpiece;

a movable member supported for generally linear movement relative to said fixed member, said movable member for contacting the second contact surface of the workpiece;

a trigger mechanism for urging said movable member into engagement with the second contact surface, said trigger mechanism having stored energy therein and adapted to apply a load to said movable member whereby said movable member moves over a first range of movement for moving the second contact surface relative the first contact surface in response to said load for actuating the workpiece, and said stored energy moving said movable member when said movable member no longer detects a reaction force from the second contact surface to thereby move said movable member over a second range of movement in response to the stored energy; and a sensor for detecting at least a portion of said second range of movement of said movable member and generating a signal in response to said portion of said second range movement of said movable member whereby said sensor generates a signal at least when the workpiece is actuated.

2. The tool according to claim 1, wherein said sensor detects said first and second range of movements of said movable member.

3. The tool according to claim 2, wherein said sensor comprises a coil, said movable member including a magnet wherein said coil detects movement of said magnet to thereby detect said range of movements of said movable member.

4. The tool according to claim 2, wherein said sensor comprises a light sensor, said movable member including a plurality of markings, wherein said light sensor detects movement of said markings to thereby detect said range of movements of said movable member.

5. The tool according to claim 1, wherein said fixed member comprises a housing, said movable member being supported in said housing and extending through at least a portion of said housing when moving over said first and second range of movements.

6. The tool according to claim 5, wherein said fixed member further comprises a rod, said rod extending through said housing, and said movable member supported on said rod.

7. The tool according to claim 6, wherein in said movable member comprises a sleeve, said rod extending through said sleeve.

8. The tool according to claim 6, wherein said rod projects from said housing and forms a fixed contact surface for contacting the first contact surface of the workpiece.

9. The tool according to claim 1, wherein said trigger mechanism comprises an energy storage member, said energy storage member applying said load on said movable member to thereby move said movable member.

10. The tool according to claim 9, wherein said energy storage member comprises a spring.

11. The tool according to claim 10, wherein said spring comprises a coil spring.

12. The tool according to claim 9, wherein said trigger mechanism comprises a lever, said lever being pivotally mounted to said fixed member and urging said energy storage member to apply said load to said movable member.

13. A tool for actuating a workpiece, the workpiece having a first contact surface and a second contact surface, the workpiece being actuated when the second contact surface is moved relative to the first contact surface and releasing energy when being actuated, said tool comprising:

a housing;

a first member supported by said housing, said first member being adapted for contacting the first contact surface of the workpiece;

a second member supported by said first member for generally linear movement relative to said housing and said first member, said second member being adapted for contacting the second contact surface of the workpiece;

a trigger mechanism for urging said second member into engagement with the second contact surface, said trigger mechanism including an energy storage member and applying a load to said second member with said energy storage member whereby said second member moves over a first range of movement for moving the second contact surface relative the first contact surface in response to said load for actuating the workpiece, said energy storage member having stored energy, at least a portion of said stored energy being released when said second member no longer detects a reaction force from the second contact surface to thereby move said second member over a second range of movement in response to the release of the stored energy; and a sensor for detecting at least said second range of movement of said second member and generating a signal in response to said second range movement of said second member whereby said sensor generates at least a signal at least when the workpiece is actuated.

14. The tool according to claim 13, wherein said energy storage member comprises a spring.

15. The tool according to claim 14, wherein said spring comprises a coil spring.

16. The tool according to claim 14, wherein said trigger mechanism comprises a lever, said lever being pivotally mounted to said first member and urging said spring to apply said load to said second member.

17. The tool according to claim 16, wherein said sensor detects said first and second range of movements of said second member.

18. The tool according to claim 17, wherein said sensor comprises a coil, said second member including a magnet wherein said coil detects movement of said magnet to thereby detect said range of movements of said second member.

19. The tool according to claim 17, wherein said sensor comprises a light sensor, said second member including a plurality of markings, wherein said light sensor detects movement of said markings to thereby detect said range of movements of said second member.

20. The tool according to claim 13, wherein said first member comprises a rod, said rod extending through said housing, and said second member supported on said rod.

21. The tool according to claim 20, wherein in said second member comprises a sleeve, said rod extending through said sleeve.

22. The tool according to claim 20, wherein said rod projects from said housing and forms a first contact surface for contacting the first contact surface of the workpiece.

23. A tool for actuating a clip-less clamp, the clamp having a first contact surface and a second contact surface, the clamp being actuated when the second contact surface is moved relative to the first contact surface and releasing energy when being actuated, said tool comprising:

a housing;

a rod supported in said housing, said rod for contacting the first contact surface of the clamp;

a sleeve supported by said rod for generally axial movement through said housing relative to said housing, said sleeve for contacting the second contact surface of the clamp;

a trigger mechanism for urging said sleeve into engagement with the second contact surface, said trigger mechanism having an energy storage member having stored energy therein and adapted to apply a load to said sleeve whereby said sleeve moves over a first range of movement for moving the second contact surface relative the first contact surface in response to said load for actuating the clamp, and said energy storage member releasing at least a portion of said stored energy when said sleeve no longer detects a reaction force from the second contact surface to thereby move said sleeve over a second range of movement in response to the release of the stored energy; and a sensor for detecting said second range of movement of said sleeve and generating a signal in response to said second range movement of said sleeve whereby said sensor generates a signal when the clamp is actuated.

24. The tool according to claim 23, wherein said sensor comprises a proximity switch.

25. The tool according to claim 24, wherein said sleeve includes a weighted member, said weighted member contacting said sensor when said sleeve moves over said second range of movement.

26. The tool according to claim 24, further comprising a spring interposed between said sensor and said weighted member, said weighted member compressing said spring when said sleeve moves over said second range of motion to actuate said sensor only after said spring is at least partially compressed.

27. The tool according to claim 23, wherein said energy storage member comprises a spring.

28. The tool according to claim 27, wherein said spring comprises a coil spring.

29. The tool according to claim 23, wherein said trigger mechanism comprises a lever, said lever being pivotally mounted to said housing and urging said energy storage member to apply said load to said sleeve.

30. A method of detecting actuation of a workpiece, the workpiece generating a release of energy when actuated, said method comprising:

urging a first member to contact the workpiece;

applying a force to the workpiece with a second member to actuate the workpiece;

sensing when the first member accelerates relative to the second member to thereby detect the actuation of the workpiece.

31. The method according to claim 30, wherein said applying a force comprises applying a compression force.

32. The method according to claim 31, wherein said applying a force comprises applying a tension force.

33. The method according to claim 30, wherein said sensing comprises detecting light impulses.

34. The method according to claim 30, wherein said urging includes urging the first member with a spring wherein the spring moves the first member relative to the second member when the workpiece is actuated.

* * * * *